United States Patent

Makino et al.

[11] Patent Number: 4,460,526
[45] Date of Patent: Jul. 17, 1984

[54] PROCESS FOR PRODUCING AROMATIC POLYIMIDE HOLLOW FILAMENTS

[75] Inventors: Hiroshi Makino; Yoshihiro Kusuki; Takashi Harada; Hiroshi Shimazaki, all of Ichihara, Japan

[73] Assignee: UBE Industries, Ltd., Yamaguchi, Japan

[21] Appl. No.: 364,638

[22] Filed: Apr. 2, 1982

[30] Foreign Application Priority Data

Apr. 3, 1981 [JP] Japan ................................. 56-49402

[51] Int. Cl.³ .............................................. B29D 27/00
[52] U.S. Cl. ....................................... 264/41; 264/561; 264/184; 264/209.5
[58] Field of Search ..................... 264/41, 209.1, 209.5, 264/184, 561, 205; 210/560.2; 428/398; 528/183, 222

[56] References Cited

U.S. PATENT DOCUMENTS

| | | | |
|---|---|---|---|
| 3,862,897 | 1/1975 | Gattus et al. | 264/216 |
| 3,899,309 | 8/1975 | Hoehn et al. | 528/183 |
| 3,985,934 | 10/1976 | Farrissey et al. | 264/184 |
| 4,214,071 | 7/1980 | Alvino et al. | 528/222 |
| 4,290,936 | 9/1981 | Sasaki et al. | 528/183 |
| 4,307,135 | 12/1981 | Fox | 264/41 |
| 4,370,290 | 1/1983 | Makino et al. | 264/184 |

Primary Examiner—Jay H. Woo
Attorney, Agent, or Firm—Finnegan, Henderson, Farabow, Garrett & Dunner

[57] ABSTRACT

Aromatic polyimide hollow fibers having an enhanced mechanical strength are produced by a process comprising the steps of: preparing a spinning dope solution of at least one aromatic polyimide having 90 molar % or more of a recurring unit of the formula (I).

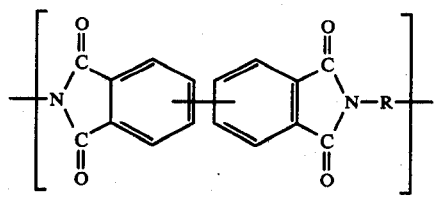

wherein R is a divalent aromatic radical, in a phenolic solvent; converting the dope solution into at least one filamentary stream thereof; and introducing the filamentary dope solution stream into a coagulating liquid having a coagulating rate coefficient of 1.5 microns/sec for the dope solution, to provide rigid hollow filaments.

20 Claims, 6 Drawing Figures

PROCESS FOR PRODUCING AROMATIC POLYIMIDE HOLLOW FILAMENTS

FIELD OF THE INVENTION

The present invention relates to a process for producing aromatic polyimide hollow filaments. More particularly, the present invention relates to a process for producing aromatic polyimide hollow filaments having an enhanced mechanical strength.

BACKGROUND OF THE INVENTION

Various methods for producing an aromatic polyimide fiber have been heretofore proposed. Particularly, it is well known that the aromatic polyimide filaments can be prepared by a method such that an aromatic polyamic acid resin, which is a precursory polymer of the corresponding polyimide resin, is dissolved in an organic polar solvent, to prepare a dope solution; the dope solution is subjected to a spinning procedure; the polyamic acid in the resultant filaments is converted into the corresponding polyimide, and; then, the resultant polyimide filaments are subjected to a drawing procedure, as disclosed in Japanese Patent Application Laid-open No. 55-16925 and Japanese Patent Application Publication No. 42-2936.

However, this conventional method requires the conversion of the polyamic acid into the corresponding polyimide in the course of the filament production. The conversion procedure results in the production of water. Therefore, it is necessary to control the conversion procedure carefully. For this reason, it is difficult to stably produce the polyimide filaments with a high reliability.

Moreover, Japanese Patent Application Laid-open No. 50-64522 discloses a special method for producing an aromatic polyimide filament, which method comprises dissolving a benzophenone tetracarboxylic acid type aromatic copolyimide in an organic bipolar solvent to prepare a spinning dope solution; extruding the dope solution through a spinneret to form filamentary streams of the dope solution; introducing the filamentary streams into a specific coagulating liquid; and, subjecting the coagulated filaments to a drawing procedure at an elevated temperature.

However, the copolyimide filaments produced by the above-mentioned method are unsatisfactory in the mechanical strength thereof.

The above-mentioned prior arts disclose methods for producing only regular types of aromatic polyimide filaments or fibers and are completely silent as to a hollow type of filament or fiber produced from the aromatic polyimides.

The inventors of the present invention conducted extensive studies to develop a process for producing aromatic polyimide hollow filaments having a high mechanical strength which is free from the above-mentioned disadvantages of the conventional methods. As a result, the inventors of the present invention found that the polyimide hollow filaments having an enhanced mechanical strength can be produced by subjecting a specific dope solution, which has been prepared by dissolving a biphenyl tetracarboxylic acid type aromatic polyimide in a phenolic solvent, to a hollow spinning procedure and, then, by coagulating the resulted hollow filamentary streams of the dope solution in a specific coagulating liquid. Thus, the inventors of the present invention accomplished this invention.

SUMMARY OF THE INVENTION

An object of the present invention is to provide a process for producing aromatic polyimide hollow filaments having a enhanced mechanical strength.

Another object of the present invention is to provide a process for producing aromatic polyimide hollow filaments directly from the corresponding aromatic polyimide material.

The above-described objects can be attained by the process of the present invention which comprises the steps of:

(1) preparing a spinning dope solution of a polymer material consisting of at least one aromatic polyimide having at least 90 molar % of a recurring unit of the formula (I):

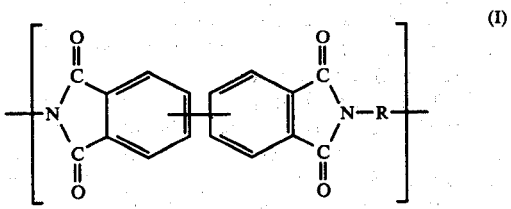

wherein R represents a divalent aromatic radical, in a solvent comprising, as a main component thereof, at least one phenolic compound;

(2) extruding the spinning dope solution through at least one spinning hole to form at least one hollow filamentary stream thereof; and (3) introducing the hollow filamentary streams of the spinning dope solution into a coagulating liquid which is compatible with the solvent but not compatible with the polymer material and which exhibits a coefficient of coagulating rate of 1.5 microns/second or more for the spinning dope solution, to provide coagulated hollow filaments of the polymer material.

The coagulated aromatic polyimide hollow filaments may be drawn at a temperature of 20° to 600° C. to produce drawn hollow filaments.

DETAILED DESCRIPTION OF THE INVENTION

Figure 1:
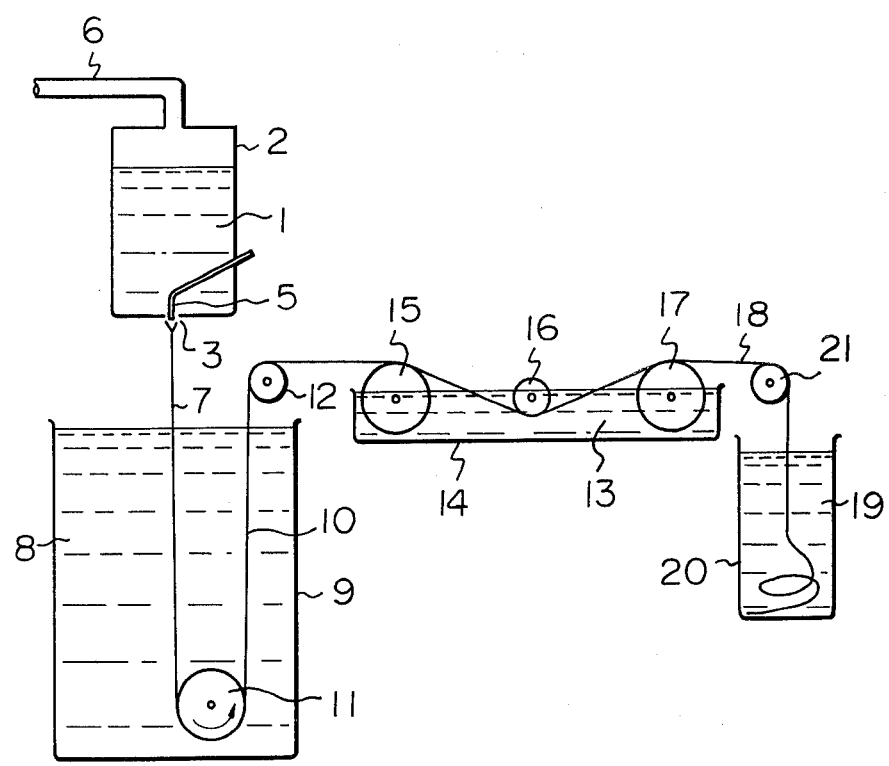
FIG. 1 is an explanatory cross-sectional side view of an apparatus for producing undrawn aromatic polyimide hollow filaments in accordance with the process of the present invention.

The term "coefficient of coagulating rate" used herein refers to a coagulating rate in microns/second, represented by a length of a portion of a spinning dope solution layer coagulated per second, when a coagulating liquid is brought into contact with the spinning dope solution for 60 seconds, in accordance with a method as described hereinafter.

The term "degree of imidization" used herein refers to a proportion in percent of the real amount of imide bonds existing in a polymeric chain of an aromatic polyimide to the theoretical amount of the imide bonds that are theoretically possible to exist in the polymeric chain. The amount of the imide bonds can be determined by means of an infrared absorption spectrum analysis. That is, the amount of the imide bonds is determined from the height of the absorption peaks at 1780 cm$^{-1}$ and 1720 cm$^{-1}$, and the amount of the amide bonds is determined from the height of the absorption peaks at 3300 cm$^{-1}$ and 1640 cm$^{-1}$.

The aromatic polyimide usable for the process of the present invention should have a degree of imidization of at least 90% as defined above.

If the degree of imidization of the aromatic polyimide to be used for the present invention is less than 90%, the resultant filaments will exhibit a poor mechanical strength and heat-resistance.

In the process of the present invention, the polymer material to be converted into a hollow filament or filaments, consists of at least one aromatic polyimide having at least 90 molar %, preferably, at least 95 molar %, of a recurring unit of the formula (I):

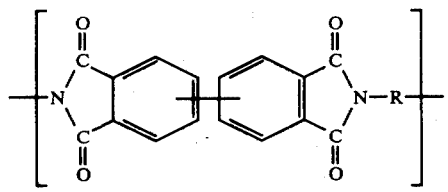

wherein R represents a divalent aromatic radical, and is soluble in the solvent comprising, as a main component thereof, at least one phenolic compound. The divalent aromatic radical represented by R may be a residue of an aromatic diamine of the formula (II): H$_2$N—R—NH$_2$, from which two amino groups are excluded. If the content of the recurring unit of the formula (I) is less than 90%, the resultant hollow filaments will exhibit an unsatisfactory mechanical strength and heat resistance.

The aromatic polyimide preferably has a high molecular weight and, therefore, exhibits a logarithmic viscosity of from 0.3 to 7.0, more preferably from 0.4 to 5.0, still more preferably from 0.5 to 4.0, determined at a concentration of 0.5 g per 100 ml of a mixture solvent of 4 parts by volume of P-chlorophenol and 1 part by volume of O-chlorophenol at a temperature of 30° C.

The aromatic polyimide can be produced by the polymerization and imidization (imide ring-cyclization) of a tetracarboxylic acid component containing at least 90 molar % at least one biphenyl tetracarboxylic acid, such as 3,3',4,4'-biphenyl tetracarboxylic acid and 2,3,3'4'-biphenyl tetracarboxylic acid, with a diamine component comprising at least one aromatic diamine of the formula (II). The polymerization and imidization operations can be carried out by any conventional process.

The aromatic polyimide usable for the process of the present invention can be prepared in the following manner. That is, a biphenyl tetracarboxylic acid component and an aromatic diamine component, which are in approximately equal molar amounts to each other, are dissolved in an organic polar solvent, for example, N-methylpyrrolidone, pyridine, N,N-dimethylacetamide, N,N-dimethylformamide, dimethyl sulfoxide, tetramethyl urea, phenol or cresol; the solution is heated at a temperature of about 80° C. or less, preferably from 0° to 60° C., so as to allow the biphenyl tetracarboxylic acid component and the aromatic diamine component to be polymerized with each other to provide a polyamic acid having a logarithmic viscosity of 0.3 or more, preferably, 0.5 to 7, determined at a concentration of 0.5 per 100 ml of N-methyl pyrrolidone at a temperature of 30° C.; the solution of the polyamic acid in the organic polar solvent, which solution can be the above mentioned polymerization reaction mixture itself, is subjected to an imidization reaction at a temperature of from 5° to 150° C. by using an imidization accelerator consisting of at least one member selected from tertiary amine compounds, such as trimethyl amine, triethyl amine and pyridine, acetic anhydride, sulfonyl chloride and carbodiimide. Otherwise, the imidization procedure may be carried out at a temperature of from 100° to 300° C., preferably, from 120° to 250° C., without using the imidization accelerator. The resultant imide polymer has a degree of imidization of 90% or more. The resultant imide polymer is isolated in the form of fine particles from the reaction mixture by means of precipitation.

In another process for producing the aromatic polyimide, the solution of the polyamic acid in the organic polar solvent, which solution has been prepared by the above mentioned process and which has a logarithmic viscosity of 0.5 or more, determined at a concentration of 0.5 g per 100 ml of N-methylpyrrolidone at a temperature of 30° C., is mixed with a large amount of a precipitating agent consisting of acetone or an alcohol, so as to allow the polyamic acid to precipitate from the solution. Otherwise, the solution of the polyamic acid is mixed with the precipitating agent while evaporating the organic polar solvent from the solution, so as to allow the polyamic acid to precipitate from the reaction mixture. The polyamic acid precipitate is isolated in the form of fine particles from the reaction mixture. The isolated polyamic acid is heated at a temperature of from 150° to 300° C. until the degree of imidization of the resultant imide polymer reaches 90% or more.

In still another process for producing the aromatic polyimide, a biphenyl tetracarboxylic acid component consisting of 2,3,3',4'- and/or 3,3',4,4'-biphenyl tetracarboxylic acid and an aromatic diamine component are polymerized and imidized in a single step in a phenolic compound in the state of a liquid or melt, at a temperature of from 120° to 400° C., preferably from 150° to 300° C. This single step process is most preferable for the process of the present invention, because the polyimide composition of the polyimide and the phenolic compound can be directly obtained and the resultant reaction mixture can be directly utilized as a spinning dope solution for the hollow spinning operation of the present invention.

In the above-mentioned processes for producing the aromatic polyimide, 3,3',4,4'-biphenyl tetracarboxylic dianhydride (hereinafter referred to as S-BPDA, for brevity) and 2,3,3',4'-biphenyl tetracarboxylic dianhydride can be preferably used as a main tetracarboxylic acid component. 2,3,3',4'- and 3,3',4,4'-biphenyl tetracarboxylic acids, and salts and ester derivatives thereof, may also be used as the main tetracarboxylic acid component. The above-mentioned biphenyl tetracarboxylic acids may be used in mixtures thereof.

The tetracarboxylic acid component may contain, in addition to the above-mentioned biphenyl tetracarboxylic acids, 10 molar % or less, preferably, 5 molar % or less, of one or more other tetracarboxylic acids, for example, pyromellitic acid, 3,3',4,4'-benzophenone tetracarboxylic acid, 2,2-bis (3,4-dicarboxyphenyl) propane, bis (3,4-dicarboxyphenyl) sulfone, bis (3,4-dicarboxyphenyl) ether, bis (3,4-dicarboxyphenyl) thioether, butane tetracarboxylic acid, and anhydrides, salts and ester derivatives thereof.

The aromatic diamine of the formula: $H_2N-R-NH_2$, which is used in the above mentioned process for producing the aromatic polyimide, is preferably selected from the group consisting of those of the formulae (III) and (IV):

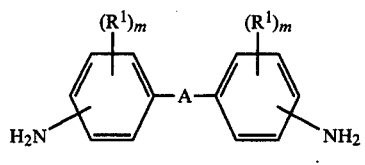

and

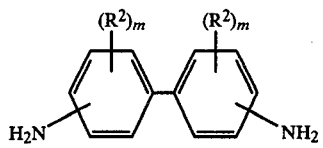

wherein $R^1$ and $R^2$, respectively, and independently from each other, represents a member selected from the group consisting of hydrogen atoms, lower alkyl radicals having 1 to 3 carbon atoms and lower alkoxy radicals having 1 to 3 carbon atoms, A represents a divalent radical selected from the group consisting of $-O-$, $-S-$, $-CO-$, $-SO_2-$, $-SO-$, $-CH_2-$ and $-C(CH_3)_2-$, and m represent an integer of from 1 to 4.

The aromatic diamines of the formula (III) may involve diphenyl ether compounds, for example, 4,4'-diaminodiphenyl ether (hereinafter referred to as DADE, for brevity), 3,3'-dimethyl-4,4'-diaminodiphenyl ether, 3,3'-dimethoxy-4,4'-diaminodiphenyl ether, 3,3'-diaminodiphenyl ether and 3,4'-diaminodiphenyl ether; diphenyl thioether compounds, for example, 4,4'-diaminodiphenyl thioether, 3,3'-dimethyl-4,4'-diaminodiphenyl thioether, 3,3'-dimethoxy-4,4'-diaminodiphenyl thioether, and 3,3'-diaminodiphenyl ether; benzophenone compounds, for example, 4,4'-diaminobenzophenone and 3,3'-dimethyl-4,4'-diaminobenzophenone; diphenyl methane compounds, for example, 3,3'-diaminodiphenyl methane, 4,4'-diaminodiphenyl methane (hereinafter referred to as DADM, for brevity), 3,3'-dimethoxy-4,4'-diaminodiphenyl methane, and 3,3'-dimethyl-4,4'-diaminodiphenyl methane; bisphenyl propane compounds, for example, 2,2-bis (4-aminophenyl) propane and 2,2-bis (3-aminophenyl) propane; 4,4'-diaminophenyl sulfoxide; 4,4'-diaminodiphenyl sulfone; and 3,3'-diaminodiphenyl sulfone.

The aromatic diamines of the formula (IV) may involve benzidine, 3,3'-dimethyl benzidine, 3,3'-dimethoxybenzidine (ortho-dianisidine) and 3,3'-diaminobiphenyl.

The diamine component may be selected from those of the formula (V):

The aromatic diamines of the formula (V) may be selected from 2,6-diamiopyridine, 3,6-diaminopyridine, 2,5-diaminopyridine and 3,4-diaminopyridine.

It is preferable that the aromatic diamine component consists of at least one member selected from the group consisting of 4,4'-diaminodiphenyl ether (DADE), 4,4'-diaminodiphenyl thioether, 4,4'-diaminodiphenyl methane (DADM), 3,3'-dimethoxy benzidine (ortho-dianisidine) (hereinafter referred to as O-DAN, for brevity) and 3,3'-dimethyl benzidine.

In the process of the present invention, a solvent, into which the aromatic polyimide is dissolved, comprises, as a main component, at least one phenolic compound. It is preferable that the solvent consists of a phenolic compound alone. The solvent usable for the process of the present invention may contain, in addition to the phenolic compound, at least one additional solvent compatible with the phenolic compound which is selected from the group consisting of carbon disulfide, dichloromethane, trichloromethane, nitrobenzene, and O-dichlorobenzene, in an amount of 50% by weight or less, preferable, 30% by weight or less.

It is preferable that the phenolic compound usable for the process of the present invention has a melting point of about 100° C. or less, more preferably, 80° C. or less, and a boiling point under atmospheric pressure of about 300° C. or less, more preferably, 280° C. or less. Examples of the preferred phenolic compounds are monohydric phenols, such as phenol, O-, m- and P-cresols, 3,5-xylenol, carvacrol and thymol, and halogenated monohydric phenols in which a hydrogen atom in the benzene nucleus of the phenol is replaced with a halogen.

The most preferable halogenated phenols for the process of the present invention are those having a melting point of about 100° C. or less and a boiling point under atmospheric pressure of about 300° C. or less and which are represented by the formula (VI):

wherein $R^3$, represents a member selected from the group consisting of hydrogen atoms and alkyl radicals having 1 to 3 carbon atoms and X represents a halogen atom. In the formula (VI), it is preferable that the substituent X is located in the P- or m-position to the hydroxyl group. These halogenated phenols have a high ability to dissolve the aromatic polyimide of the biphenyl tetracarboxylic acid type.

The halogenated phenols usable for the process of the present invention include 3-chlorophenol, 4-chlorophenol (P-chlorophenol, hereinafter referred to as PCP, for brevity), 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene and 4-bromo-2-hydroxytoluene.

In the process of the present invention, in the case where the aromatic polyimide is prepared by subjecting the biphenyl tetracarboxylic acid component and the aromatic diamine component to the single-step polymerization-imidization procedure in a phenolic compound in the state of a liquid or melt at a temperature of from 120° to 400° C., as is described for the production of the aromatic polyimide, the resultant polymerization reaction mixture can be directly utilized as a dope solution for the spinning operation. If necessary, the polyimide concentration or viscosity of the reaction mixture is adjusted to a desired value before being subjected to the spinning operation.

On the other hand, in the case where the aromatic polyimide is prepared as an isolated product in the form of fine particles, the polyimide composition usable for the process of the present invention can be prepared by dispersing the polyimide particles in a solvent consisting mainly of the phenolic compound while stirring the mixture and heating the dispersion to a temperature high enough to dissolve the polyimide particles in the solvent thoroughly.

In the process of the present invention, the polymer material to be dissolved in the solvent may comprise at least two types of imide polymers, each having at least 90 molar % of a recurring unit of the formula (I). Also, the polymer material may contain, in addition to a major portion consisting of one or more imide polymers having at least 90 molar % of a recurring unit of the formula (I), a minor portion consisting of one or more other types of aromatic imide polymers.

In the process of the present invention, it is preferable that the spinning dope solution contains the polymer material in a total content of from 5 to 30% by weight, more preferably, from 7 to 20% by weight, based on the entire weight of the spinning dope solution. Also, it is preferable that the spinning dope solution is a homogeneous solution and exhibits a rotation viscosity of at least 500 centipoises, more preferably, from 10 to 100,000 poises, at a temperature of from 0° to 150° C., particularly, from 20° to 120° C., at which the spinning dope solution is extruded.

In the process of the present invention, the spinning dope solution is extruded through at least one hollow spinning hole, and the resultant hollow filamentary stream of the dope solution is introduced into a coagulating procedure in which the hollow filamentary stream is coagulated in a coagulating liquid compatible with the phenolic solvent, but not with the polymer material. In this coagulating procedure, it is important that the coagulating liquid exhibit a coagulating rate coefficient of 1.5 microns/second or more, preferably, 2.0 microns/second or more, for the spinning dope solution used. If the coagulating rate coefficient of the coagulating liquid for the spinning dope solution used is less than 1.5 microns/second, the coagulating rate of the dope solution stream in the coagulating liquid is too small, causing the coagulating procedure to become unstable and the resultant hollow filament to exhibit an unsatisfactory mechanical strength. In the case where the coagulating procedure is carried out at a small coagulating rate of the dope solution stream and the resultant coagulated hollow filament, which has not yet completely coagulated, is brought into contact with a guide roll under tension, the incompletely coagulated hollow filament is easily deformed on the peripheral surface of the guide roll, so as to become flat. In order to avoid the deformation of the hollow filament, it is necessary to decrease the speed of the hollow filament passing through the cagulating liquid or to increase the distance between the upper surface of the coagulating liquid and the guide roll with which the hollow filament comes into contact for the first time. The above-mentioned decrease in speed or increase in distance causes the coagulating procedure to become poor in productivity and economy. Especially, when the distance between the upper surface of the coagulating liquid and the first guide roll is increased, an undesirable pulsation or vibration of the incompletely coagulated hollow filament occurs. This pulsation or vibration results in an unevenness in the diameter of, or the thickness of, the annular body or results in the flattening of the hollow filament.

Accordingly, it is important that the coagulation of the hollow filamentary stream of the dope solution be completed at a high coagulating rate in the coagulating liquid.

In the process of the present invention, the spinning dope solution can be shaped into at least one hollow filament by any conventional hollow spinning method. The formation of the hollow filament can be effected by using any type of spinning nozzle for forming the hollow filament, for example, a tube-in-orifice type hollow nozzle or a segmented arc type hollow nozzle. A preferable spinning nozzle for the process of the present invention is of the tube-in-orifice type.

Figure 2:
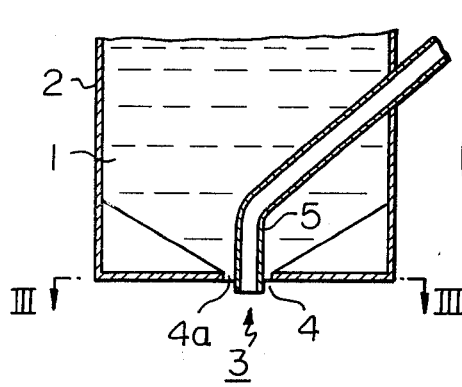
FIG. 2 is an explanatory, partially cross-sectional side view of a spinning nozzle for forming a hollow filamentary stream of a spinning dope solution.
Figure 3:
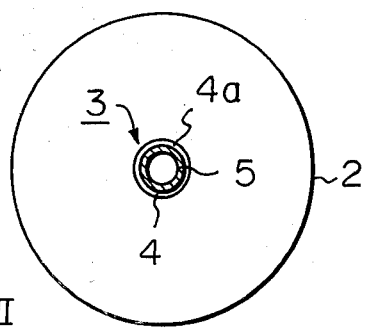
FIG. 3 is a bottom view of the spinning nozzle indicated in FIG. 2, along line III—III.

The hollow spinning procedure in the process of the present invention can be carried out, for example, by using an apparatus as shown in FIGS. 1, 2 and 3.

Referring to these drawings, a spinning dope solution 1 is supplied into a spinning head 2 having a spinning nozzle (spinneret) 3. The temperature of the spinning dope solution 1 in the spinning head 2 is maintained at a predetermined level of from 20° to 150° C. When the spinning nozzle 3 is of a tube-in-orifice type, as indicated in FIGS. 2 and 3, a hole 4 is formed in the bottom of the spinning head 2. The diameter of the hole 4 is variable, depending on the desired denier of the hollow filament to be produced. Usually, the diameter of the hole 4 is in the range of from 0.2 to 2 mm. Into the hole 4, a tube 5 is concentrically inserted, in the manner indicated in FIGS. 1, 2 and 3, to form an annular spinning orifice 4a around the tube 5. The size of the tube 5 depends on the size of the hole 4 and the desired width of the annular slit 4a. Usually, the lower end of the tube 5 has an outside diameter of from 0.15 to 1.6 mm and an inside diameter of from 0.05 to 1.4 mm.

The spinning dope solution 1 is extruded through the annular slit 4a at the predetermined spinning temperature, while a back pressure usually of from 0.1 to 20 kg/cm$^2$ is applied to the spinning dope solution 1 in the spinning head 2 by blowing an inert gas, for example, nitrogen gas, into the spinning head 2 through a conduit line 6, while a stream of a gas or liquid, for example, hot water, flows through the tube 5. The resultant hollow filamentary stream 7 of the spinning dope solution is introduced under tension into a first coagulating liquid 8 contained in a first coagulating vessel 9, while the hollow filamentary stream 7 of the spinning dope solution 1 is stretched at a predetermined extent.

The resultant first coagulated hollow filament 10 is withdrawn from the first coagulating vessel 9 through guide rolls 11 and 12 and, then, introduced into a second coagulating liquid 13 contained in a second coagulating vessel 14, and recycled one or more times along the path passing through the guide rolls 15, 16 and 17 in the manner indicated in Table 1. In the second coagulating vessel 14, the coagulation of the hollow filaments is substantially completed. The resultant second coagulated hollow filament 18 is introduced through a guide roll 21 into an inert medium 19 contained in a storing tank 20 and stored therein. All or some of guide rolls 11, 12, 15, 17 and 21 may be driven separately from each other each by a driving motor (not shown in the drawings, each at a predetermined speed, so as to stretch the hollow filaments to a predetermined extent. Usually, the second coagulated hollow filament is delivered from the second coagulating vessel 14 at a speed of from 1 to 100 m/min, preferably, from 2 to 80 m/min.

Before being subjected to the hollow spinning procedure, the spinning dope solution is usually filtered and, then, degassed at a temperature of from 20° to 200° C., preferably, from 30° to 150° C. Subsequently, the degassed dope solution is subjected to the extruding procedure through the hollow spinning nozzle, at an extruding temperature of from 20° to 150° C., preferably, from 30° to 120° C., at a back pressure of from about 0.1 to 20 kg/cm$^2$G, preferably, from 0.2 to 10 kg/cm$^2$G, more preferably, from 0.3 to 5 kg/cm$^2$G, so as to continuously form a hollow filamentary stream from the dope solution.

In the case where the tube-in-orifice type hollow spinning nozzle is used, the extruded procedure of the dope solution is carried out while a gas or liquid, preferably, a liquid, flows through the tube 5, as indicated in FIGS. 1 through 3, into the hollow space in the resultant hollow filamentary stream of the dope solution, so as to form a core of the hollow filamentary stream. The liquid flow is effective for preventing an undesirable deformation of the extruded hollow filamentary stream of the dope solution during the coagulating procedure.

The core liquid preferably consists of at least one polar liquid compound which is not capable of coagulating the dope solution and of dissolving the polymer material in the dope solution. Usually, water is used as the core liquid.

Then, the hollow filamentary stream of the dope solution is introduced into a coagulating liquid, which is usually maintained at a temperature of from about −10° C. to 60° C. A solidified filament is obtained.

The coagulating liquid usable for the present invention should be compatible with the phenolic solvent, but not with the polymer material. The coagulating liquid comprises at least one member selected from the group consisting of water; lower aliphatic alcohols having 1 to 5 carbon atoms, for example, methyl alcohol, ethyl alcohol, n-propyl alcohol and iso-propyl alcohol; lower aliphatic ketones having 3 to 5 carbon atoms, for example, acetone, methyl ethyl ketone, diethyl ketone and methyl propyl ketone; tetrahydrofuran; dioxane; aliphatic ethers, such as ethyleneglycol monomethylether; aliphatic amides, such as dimethyl acetamide and dimethyl formamide; dimethylsulfoxide; diethylsulfoxide; lower alkylene glycols, for example, ethylene glycol and propylene glycol; lower aliphatic carboxylic acid having 1 to 4 carbon atoms, for example, formic acid, acetic acid, propionic acid and butyric acid, and mixtures of at least one of the above-mentioned compounds with water, preferably, in a weight ratio of at least 3:7.

Just after the spinning dope solution is extruded through the spinning nozzle, the non-coagulated hollow filamentary stream of the dope solution is preferably stretched, under tension, to a small extent. Also, it is preferable that the hollow filamentary stream be introduced into the coagulating liquid under tension, so as to be slightly stretched.

After the hollow filament stream of the dope solution is coagulated to such an extent that the hollow filament is not easily deformed, the coagulated hollow filament is brought into contact with a desired guide roll or stretching roll.

As indicated in FIG. 1, the hollow filamentary stream of the dope solution may be coagulated in a single step coagulating procedure or in a two or more step coagulating procedure. The two or more step coagulating procedure is effective for completely eliminating the phenolic solvent from the body of the coagulated hollow filament.

The resultant hollow filament is optionally washed with an inert washing medium, for example, water, to eliminate the phenolic solvent and then, stored in an inert medium, for example, water. Otherwise, the washed hollow filament may be dried in an adequate manner before storage.

The hollow filament produced in accordance with the process of the present invention may be drawn in a dry or wet condition, at a temperature of from 20° to 600° C., preferably, from 30° to 500° C., at a draw ratio of from 1.1 to 5.0, preferably, from 1.2 to 4.0. The drawing procedure is effective for increasing the mechanical strength of the hollow filament. For example, undrawn hollow filament produced in accordance with the process of the present invention usually exhibits a tensile strength approximately of 2.5 g/d or more. By applying the drawing procedure to the undrawn hollow filament, the tensile strength of the hollow filament can be increased to 5.0 g/d or more, preferably, 10 g/d or more.

The drawing operation is preferably carried out by using either a hot plate contact method, in which the filament is drawn in contact with a hot plate heated to an elevated temperature, or an infrared heating method, in which the filament is drawn while being heated by infrared rays. The drawing operation may be carried out in any type of atmosphere, such as air or an inert gas. However, high temperature drawing is preferably carried out in an inert gas atmosphere.

The hollow polyimide filaments produced by the process of the present invention exhibit a high mechanical strength, excellent resistance to heat and chemicals and an excellent electrical insulating property. Therefore, the hollow polyimide filament of the present invention can be used in the applications of high temperature electrical insulating materials, cable coverings, protective clothing, curtains, packing and linings.

Since the hollow polyimide filaments exhibit a semipermeable property with various gas mixtures and/or liquid mixtures, the hollow polyimide filaments of the present invention are useful as a separating module.

Examples of the present invention and comparative examples will be described hereunder.

In the examples and comparative examples, the coefficient of the coagulating rate of a coagulating liquid for a spinning dope solution used was determined by the following method.

Figure 4:
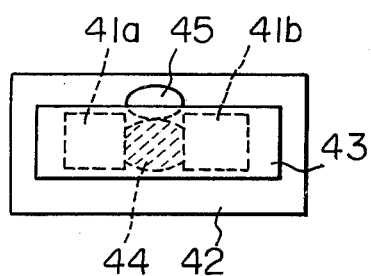
FIG. 4 is an explanatory plan view of a device for measuring a coefficient of coagulating rate of a coagulating liquid for a spinning dope solution.
Figure 5:
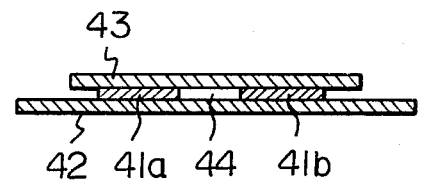
FIG. 5 is an explanatory front view of the device indicated in FIG. 4.
Figure 6:
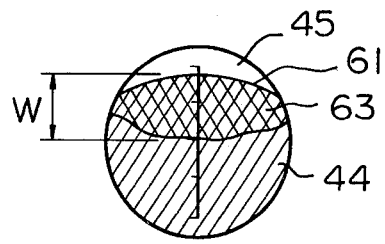
FIG. 6 is an explanatory diagram of a microscopic measurement of the coefficient of coagulating rate.

Referring to FIGS. 4, 5 and 6, a pair of glass cover plates 41a and 41b, having a thickness of about 0.15 mm, were placed about 1 cm apart from each other on a glass slide plate 42 so as to form a space therebetween. A predetermined amount of a spinning dope solution was placed in the space between the glass cover plates 41a and 41b, and, then, another glass slide plate 43 was superimposed on the glass cover plates 41a and 41b, to form a layer 44 of the dope solution having a uniform thickness.

Subsequently, the above-mentioned device was placed in a microscope (not shown in the drawings) and a drop of a coagulating liquid was placed on the glass slide plate 42 in such a manner that a layer 45 of the coagulating liquid came into contact with the layer 44 of the dope solution, so that a peripheral portion of the dope solution layer 44 was coagulated. The coagulating portion of the dope solution layer 44 was observed by a microscope in the manner indicated in FIG. 6. Referring to FIG. 6, the peripheral surface 61 of the dope solution layer 44 was brought into contact with the coagulating liquid layer 45, so as to form a coagulated peripheral zone 63 in the form of a strip. Just 60 seconds after the contact of the dope solution layer 44 with the coagulating liquid layer 45, the largest width W of the coagulated zone 63 was measured.

The coefficient of the coagulating rate of the coagulating liquid for the dope solution was represented by W/60.

EXAMPLE 1 (Preparation of Spinning Dope Solution 1)

A mixture of 40 millimoles of 3,3',4,4'-biphenyl tetracarboxylic dianhydride (S-BPDA), 40 millimoles of 4,4'-diaminodiphenyl ether (DADE) and 180 g of dimethyl acetamide was placed in a separable flask with a stirrer and a conduit for introducing thereinto nitrogen gas. The mixture was subjected to a polymerization reaction at a temperature of 20° C. for 6 hours while flowing nitrogen gas through the flask, to prepare polyamic acid. The resultant polymerization mixture was cooled to a temperature of 10° C. or less and, then, admixed with 180 g of dimethyl acetamide, 240 millimoles of acetic anhydride and 240 millimoles of pyridine. The admixture was homogenized by thoroughly stirring it, and, then, gradually heated to and maintained at a temperature of about 30° C. for about 20 minutes so as to allow the resultant aromatic imide polymer to precipitate in the form of fine particles from the polymerization mixture. Thereafter, the polymerization mixture was heated to a temperature of from 70° to 80° C. and maintained at this temperature for 30 minutes or more to complete the imidization reaction and the precipitation of the aromatic imide polymer.

The polymerization mixture containing the aromatic imide polymer powder was added to a large amount of methyl alcohol, and the admixture was filtered to separate the imide polymer powder. The imide polymer powder was thoroughly washed with methyl alcohol and, then, dried under a reduced pressure at room temperature.

The resultant aromatic polyimide powder was subjected to a determination of degree of imidization. The result is indicated in Table 1. Also, the powder was subjected to a determination of logarithmic viscosity in the following manner. A viscosity of the polyimide powder was measured at a concentration of 0.5 g per 100 ml of a mixture of 4 parts by volume of p-chlorophenol and 1 part by volume of o-chlorophenol at a temperature of 30° C. The logarithmic viscosity of the polyimide was calculated from the following equation.

$$L = \frac{\log_e (V_1/V_2)}{C}$$

wherein L represents a logarithmic viscosity of the polyimide, $V_1$ represents the above-mentioned viscosity of the polyimide solution, $V_2$ represents a viscosity of the p-chlorophenol-o-chlorophenol mixture solvent and C represents the concentration of the polyimide in the polyimide solution.

The result is indicated in Table 1.

A mixture of 10 g of the above-mentioned polyimide powder and 90 g of p-chlorophenol was placed in a separable flask with a stirrer and heated at a temperature of from 80° to 90° C., so as to dissolve the polyimide powder in the fused p-chlorophenol. The resultant solution was filtered under pressure by using a press-filtering apparatus equipped with a filter comprising two pieces of filtering paper, which does not allow particles having a size of 3 microns or more to pass therethrough, and a piece of 100 mesh metal net (ASTM Standard). The filtered solution was used as spinning dope solution 1. The rotation viscosity of the dope solution 1 at a temperature 60° C. is indicated in Table 1.

EXAMPLE 2 (Preparation of Spinning Dope Solution 2)

The same procedures as those described in Example 1 were carried out, except that o-dianisidine (o-DAN) was used in place of DADE and the polymerization time was changed from 6 hours to 4 hours.

The properties of the resultant polyimide and spinning dope solution 2 are indicated in Table 1.

EXAMPLE 3 (Preparation of Spinning Dope Solution 3)

The same procedures as those described in Example 1 were carried out, except that the polymerization time was changed from 6 hours to 5 hours.

The properties of the resultant polyimide and spinning dope solution 3 are indicated in Table 1.

TABLE 1

| | | Example No. | | |
|---|---|---|---|---|
| | Item | 1 | 2 | 3 |
| Polymerization | Type of tetracarboxylic acid monomer | S—BPDA | S—BPDA | S—BPDA |
| | Type of diamine monomer | DADE | o-DAN | DADE |
| | Polymerization time (hours) | 6 | 4 | 5 |
| Polyimide | Degree of imidization (%) | 95 or more | 95 or more | 95 or more |
| | Logarithmic viscosity (30° C.) | 2.1 | 1.7 | 1.9 |
| Dope solution | Concentration (%) | 10 | 10 | 10 |
| | Rotation viscosity (poise, 60° C.) | 4200 | 2800 | 3400 |

EXAMPLES 4 THROUGH 10

(Preparation of Hollow Filaments)

In each of the Examples 4 through 10, aromatic polyimide hollow filaments were produced from the spinning dope solution indicated in Table 2 by using the hollow spinning apparatus indicated in FIGS. 1 through 3.

Referring to FIGS. 1, 2 and 3, the spinning dope solution 1 was fed into the spinning head 2 and maintained at the temperature indicated in Table 2. The hollow spinning nozzle 3 was of a tube-in-orifice type and had a circular hole 4 having a diameter of 1.6 mm and a tube 5 inserted concentrically into the hole 4. The lower end of the tube 5 had an outside diameter of 1.0 mm and an inside diameter of 0.5 mm. The resultant annular spinning orifce 4a had an outside diameter of 1.6 mm, an inside diameter of 1.0 mm and a width of 0.3 mm.

The back pressure indicated in Table 2 was applied to the dope solution 1 in the spinning head 2 by blowing nitrogen gas into the spinning head 2 through the conduit 6, so as to extrude the dope solution 1 through the annular spinning orifice 4a, and to form a hollow filamentary stream of the dope solution, while a core gas or liquid, indicated in Table 2, flowed into the hollow space of the resultant hollow filamentary stream 7 through the tube 5.

The hollow filamentary stream 7 of the dope solution was introduced into a first coagulating liquid 8, which was of the type indicated in Table 2, and was contained at a depth of 40 cm in a first coagulating vessel 9.

The first coagulated hollow filament 10 was removed from the first coagulating vessel 9 through guide rolls 11 and 12 and, then, introduced into the second coagulating liquid 13, which was of the type indicated in Table 2, and was contained in a second coagulating vessel 14. In the second vessel 14, the hollow filament 10 was recycled 8 times along the path passing through guide rolls 15, 16 and 17, in the manner indicated in FIG. 1. The distance between the centers of the guide rolls 15 and 17 was 80 cm.

The second coagulated hollow filament 18 was withdrawn from the second vessel 14 through a guide roll 21 and introduced into an inert storing liquid 19, which was of the same type as that of the second coagulating liquid, and was contained in a storing tank 20.

The temperatures of the first and second coagulating liquid was indicated in Table 2.

The delivery speed of the second coagulated hollow filament 18 was as indicated in Table 2.

The resultant hollow filament was subjected to an observation of its cross-sectional profile and measurement of the inside and outside diameters thereof. The results are indicated in Table 2.

Also, the resultant hollow filament was subjected to a determination of the separating properties thereof, in the following manner.

A liquid-separating module was made by bonding a bundle composed of a plurality of the hollow filaments to a stainless steel tube with an epoxy resin bonding agent. The module was placed in an apparatus for measuring the liquid-separating property.

An aqueous saline solution of 0.5% by weight of sodium chloride was supplied to the outside of the hollow filament bundle under a pressure of 40 kg/cm$^2$G. The permeating rate of the saline solution through the hollow filaments was measured. Also, the concentration of sodium chloride in the saline solution, that permeated through the hollow filaments into the hollow spaces thereof, was measured by using an electro-conductivity tester.

The percent of salt exclusion of the hollow filament was calculated in accordance with the following equation.

$$\text{Percent of salt exclusion} = \frac{C_0 - C_1}{C_0} \times 100$$

wherein $C_0$ represents the concentration of salt in the original saline solution and $C_1$ represents the concentration of salt in the saline sollution that permeated through the hollow filaments. The results are indicated in Table 2.

TABLE 2

| Example No. | Formation of hollow filamentary stream of dope solution ||||  Coagulation of hollow filament ||||| 
| | | | | | First coagulating liquid ||| Second coagulating liquid ||
| | Type of dope solution | Back pressure (kg/cm$^2$G) | Extruding temperature (°C.) | Core gas or liquid | Type | Coefficient of coagulating rate ($\mu$/sec) | Temperature (°C.) | Type | Coefficient of coagulating rate ($\mu$/sec) | Temperature (°C.) |
|---|---|---|---|---|---|---|---|---|---|---|
| 4 | 1 | 1.9 | 90 | water | Ethanol-water mixture (50:50) | 4.0 | 10 | The same as first liquid | 4.0 | 15 |
| 5 | 3 | 1.2 | 96 | air | Methanol-water mixture (40:60) | 2.5 | 12 | The same as first liquid | 2.5 | 12 |
| 6 | 2 | 1.2 | 70 | water | Ethanol | 2.2 | 12 | The same as first liquid | 2.2 | 10 |
| 7 | 2 | 1.2 | 70 | water | Ethanol | 2.2 | 12 | The same as first liquid | 2.2 | 10 |
| 8 | 2 | 1.2 | 70 | water | Ethanol | 2.2 | 12 | The same as first liquid | 2.2 | 10 |
| 9 | 1 | 0.7 | 85 | water | Methanol | 4.2 | 5 | Methanol-water | — | 18 |

TABLE 2-continued

| | | | | | | | | mixture (80:20) | | |
|---|---|---|---|---|---|---|---|---|---|---|
| 10 | 1 | 1.1 | 87 | Methanol-p-chlorophenol mixture (50:50) | Methanol-water mixture (40:60) | 2.5 | 1 | The same as first liquid | 2.5 | 10 |

| | | Hollow filament | | | | |
|---|---|---|---|---|---|---|
| | Delivery speed of coagu- | Configuration | | | Separating property | |
| Example No. | lated hollow filament (m/min) | Cross-sectional profile | Outside diameter (μ) | Inside diameter (μ) | Permeating rate m³/m². day | Percent of salt exclusion |
| 4 | 3.8 | Accurate circular annulus | 350 | 83 | 0.05 | 99.2 |
| 5 | 8.0 | Elliptic circular annulus | 360 | 75 | 0.10 | 85.0 |
| 6 | 4.8 | Accurate circular annulus | 350 | 80 | 0.99 | 50.0 |
| 7 | 7.2 | Accurate circular annulus | 290 | 77 | 2.30 | 43.0 |
| 8 | 11.3 | Accurate circular annulus | 220 | 73 | 4.80 | 13.6 |
| 9 | 3.2 | Accurate circular annulus | 350 | 85 | >10.0 | ≈0 |
| 10 | 5.1 | Accurate circular annulus | 370 | 76 | — | — |

Comparative Example 1

The same procedures as those described in Example 4 were carried out, except that the first coagulating liquid consisted of water alone and had a coefficient of coagulating rate of 0.2 microns/sec or less for the dope solution used.

It failed to produce the hollow filament, because the coagulating procedures for the hollow filamentary stream of the dope solution were not thoroughly effected and it was difficult to collect the coagulated filament.

Comparative Example 2

The same procedures as those described in Example 1 were carried out, except that each of the first and second coagulating liquids consisted of a mixture of one part by weight of glycerine with one part by weight of water and exhibited a coefficient of coagulating rate of 0.3 microns/sec for the dope solution used. The resultant filament was a flat filament.

Comparative Example 3

The same procedures as those described in Example 1 were carried out, except that each of the first and second coagulating liquids consisted of a mixture of 20 parts by weight of ethylene glycol with 80 parts by weight of water and exhibited a coefficient of coagulating rate of 0.25 for the dope solution used. Only a flat filament was obtained.

EXAMPLE 11

A polyimide powder A was produced in accordance with the same procedures as those described in Example 1, except that the polymerization time was approximately 2.5 hours.

The logarithmic viscosity of the resultant polyimide A was 1.0 which was measured by the same method as that described in Example 1. The degree of imidization of the polyimide A was 95% or more.

The same procedures as those described above were carried out, except that the polymerization time was 7 hours to prepare a polyimide powder B. The logarithmic viscosity of the resultant polyimide B was 2.4. The degree of imidization of the polyimide B was 95% or more.

A dope solution was prepared in the same manner as that described in Example 1, except that 15 parts by weight of the polyimide powder A, 3 parts by weight of the polyimide powder B and 135 parts by weight of p-chlorophenol were used. The resultant dope solution exhibited a rotation viscosity of 2900 poises at a temperature of 60° C.

The dope solution was converted to a hollow filament in the same manner as that described in Example 4, except that each of the first and second coagulating liquids consisted of a mixtre of 50 parts by weight of methyl alcohol with 50 parts by weight of water, exhibited a coagulating rate coefficient of 3.8 microns/sec for the dope solution used and had a temperature of 10° C.; that the back pressure was 0.5 kg/cm²G; that the core liquid consisted of water alone; and that the delivery speed of the second coagulated hollow filament was 4.2 m/min.

The resultant hollow filament exhibited a cross-sectional profile in the form of an approximately accurate circular annulus and had an outside diameter of 140 microns and a thickness of annulus of 40 to 45 microns.

The separating properties of the hollow filament were determined in accordance with the same method as that described in Example 4. The permeating rate of the saline solution through the hollow filament was 0.13 m$^3$/m$^2$.day and the percent of salt exclusion of the hollow filament was 66%.

EXAMPLE 12

The same procedures as those described in Example 11 were carried out, except that o-dianisidine (o-DAN) was used as an aromatic diamine in place of DADE.

The resultant polyimide exhibited a logarithmic viscosity of 1.7 and a degree of imidization of 95% or more.

A spinning dope solution, containing 10% by weight of the above-mentioned polyimide powder dissolved in p-chlorophenol, was prepared in accordance with the same method as that described in Example 1. The dope solution exhibited a rotation viscosity of 3100 poises at a temperature of 60° C.

The dope solution was converted to a hollow filament by the same method as that described in Example 4, except that the extruding temperature was 80° C.; the back pressure ws 0.38 kg/cm$^2$G; the core liquid consisted of 50 parts by volume of phenol and 50 parts by volume of formamide; each of the first and second coagulating liquids consisted of a mixture of 70 parts by weight of methyl alcohol with 30 parts by weight of water, exhibited a coagulating rate coefficient of 2.3 microns/sec; and the delivery speed of the second coagulated hollow filament was 4.2 m/min.

The resultant coagulated filament was washed with hot water at a temperature of from 90° to 100° C., immersed in methyl alcohol at a temperature of 20° C. for 24 hours, heated at a temperature of about 80° C. to eliminate water from the hollow filament, and then, naturally dried in an ambient atmosphere.

The resultant hollow filament exhibited a cross-sectional profile in the form of an approximately accurate circular annulus and had an outside diameter of 200 microns and a thickness of the annulus of 30 microns, and had the mechanical properties indicated in Table 3.

The hollow filament was subjected to a gas-separating test in the following manner.

A bundle consisting of a plurality of the hollow filaments was bonded to a glass tube with an epoxy resin bonding agent to provide a gas-separating module. The permeating rates of hydrogen gas and carbon monoxide gas through the hollow filaments were measured separately under a pressure of 2 kg/cm$^2$G.

The hydrogen gas-permeating rate was $8 \times 10^{-7}$·cm$^3$/cm$^2$·sec·cmHg, and the carbon monoxide gas-permeating rate was $1.3 \times 10^{-8}$ cm$^3$/cm$^2$·sec·cmHg. That is, the ratio ($P_{H2}/P_{CO}$) of the hydrogen gas-permeating rate to the carbon monoxide gas-permeating rate was approximately 60:1. It was evident that the hollow filament had an excellent gas separating property of hydrogen gas from carbon monoxide gas.

The gas permeating rate was calculated from the following equation;

$$P = \frac{W}{A \times T \times D_p} \left( \frac{\text{cm}^3}{\text{cm}^2 \cdot \text{sec} \cdot \text{cmHg}} \right)$$

wherein P represents the permeating rate of a gas; W represents an amount by volume (cm$^3$) of a gas permeated through a membrane (tubular membrane of the hollow filament); A represents an area (cm$^2$) of the membrane; T represents a permeating time (seconds) of the gas through the membrane; and $D_p$ represents a differential pressure of the gas between one side and the other side of the membrane.

The hollow filament was drawn at a temperature of 350° C. and separately, at a temperature of 400° C. at a draw ratio of 2.0. The properties of the resultant drawn hollow filaments are indicated in Table 3.

TABLE

| | Undrawn | Drawn at 350° C. | Drawn at 400° C. |
|---|---|---|---|
| Cross-sectional profile | Approximately accurate circle | Approximately accurate circle | Approximately accurate circle |
| Outside diameter (μ) | 200 | 140 | 130 |
| Inside diameter (μ) | 140 | 100 | 100 |
| Tensile strength (g/d) | 3.8 | 12.0 | 12.0 |
| Ultimate elongation (%) | 24 | 2.1 | 2.3 |
| Young's modulus (g/d) | 102 | 420 | 570 |

We claim:

1. A process for producing aromatic polyimide hollow filaments comprising the steps of:
   (1) preparing a spinning dope solution of a polymer material consisting of at least one aromatic polyimide having at least 90 molar % of a recurring unit of the formula (I):

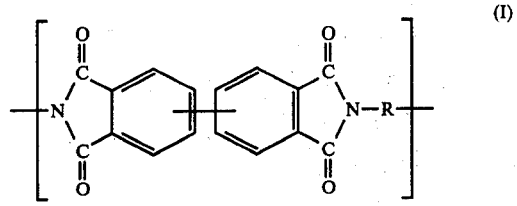

wherein R represents a divalent aromatic radical, in a solvent comprising, as a main component thereof, at least one phenolic compound;
   (2) extruding said spinning dope solution through at least one spinning hole to form at least one hollow filamentary stream thereof; and
   (3) introducing said hollow filamentary streams of said spinning dope solution into a coagulating liquid which is compatible with said solvent, but not compatible with said polymer material, and which exhibits a coefficient of coagulating rate of 1.5 microns/second or more for said spinning dope solution, to provide coagulated hollow filaments of said polymer material.

2. The process as claimed in claim 1, wherein the divalent aromatic group represented by R in the formula (I) is a residue of an aromatic diamine from which two amino groups are excluded.

3. The process as claimed in claim 1, wherein said aromatic polyimide has a logarithmic viscosity of from 0.3 to 7.0, determined at a concentration of 0.5 g per 100 ml of a mixture solvent of 4 parts by volume of P-chlorophenol and 1 part by volume of O-chlorophenol at a temperature of 30° C.

4. The process as claimed in claim 1, wherein said aromatic polyimide is a polymerization-and-imidization product of a tetracarboxylic acid component comprising at least 90 molar % of at least one biphenyl tetracarboxylic acid or its anhydride, salt or ester with a diamine component comprising at least one aromatic diamine of the formula (II):

$$H_2N-R-NH_2 \qquad (II)$$

wherein R is as defined above.

5. The process as claimed in claim 4, wherein said biphenyl tetracarboxylic acid is selected from the group consisting of 3,3',4,4'-biphenyl tetracarboxylic anhydride and 2,3,3',4'-biphenyl tetracarboxylic anhydride.

6. The process as claimed in claim 4, wherein said tetracarboxilic acid component contains 10 molar % or less of at least one member selected from the group consisting of pyromellitic acid, 3,3,',4,4'-benzophenone tetracarboxylic acid, 2,2-bis (3,4-dicarboxyphenyl) propane, bis (3,4-dicarboxyphenyl) sulfone, bis (3,4-dicarboxyphenyl) ether, bis (3,4-dicarboxyphenyl) thioether, butane tetracarboxylic acid, and anhydrides, salts and esters of the above-mentioned compounds.

7. The process as claimed in claim 4, wherein said aromatic diamine is selected from the group consisting of those of the formulae (III) and (IV):

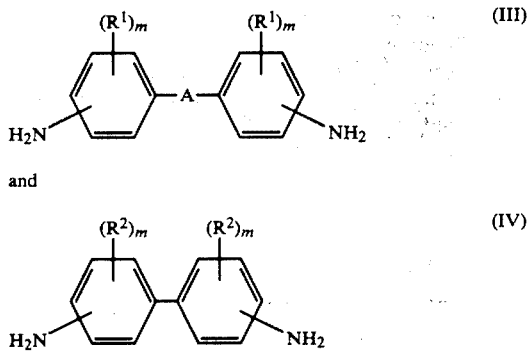

wherein $R^1$ and $R^2$ respectively represent, independently from each other, a member selected from the group consisting of a hydrogen atom, lower alkyl radicals having 1 to 3 carbon atoms and lower alkoxyl radicals having 1 to 3 carbon atoms; A represents a divalent linking member selected from the class consisting of —O—, —S—, —C—, —SO$_2$—, —SO—, —CH$_2$— and —C(CH$_3$)$_2$—, and m represents an integer of from 1 to 4.

8. The process as claimed in claim 1, wherein said phenolic compound has a melting point of 100° C. or less and a boiling point of about 300° C. or less under atmospheric pressure.

9. The process as claimed in claim 1, wherein said phenolic compound is selected from the group consisting of phenol, alkyl-substituted monohydric phenol compounds and halogenated monohydric phenol compounds.

10. The process as claimed in claim 9, wherein said alkyl-substituted monohydric phenol compound is selected from the group consisting of O-, m-and P-cresols, 3,5-xylenol, carvacrol and thymol.

11. The process as claimed in claim 9, wherein said monohydric halogenated phenol compound is selected from the group consisting of those of the formula (VII):

wherein $R^3$ represents a member selected from the group consisting of a hydrogen atom and alkyl radicals having 1 to 3 carbon atoms, and X represents halogen atoms.

12. The process as claimed in claim 1, wherein said spinning dope solution contains 5 to 30% by weight of said polymer material.

13. The process as claimed in claim 1, wherein said spinning dope solution has a rotation viscosity of at least 500 centiposes at a temperature of from 0° to 150° C.

14. The process as claimed in claim 1, wherein the coagulating rate coefficient of said coagulating liquid is 2.0 microns/second for said spinning dope solution.

15. The process as claimed in claim 1, wherein said coagulating liquid comprises at least one member selected from the groups consisting of lower aliphatic alcohols having 1 to 5 carbon atoms, lower aliphatic ketones having 3 to 5 carbon atoms, tetrahydrofuran, dioxane, ethyleneglycol monomethylether, lower alkylene glycols, diamethylacetamide, dimethylformamide, dimethylsulfoxide, diethylsulfoxide, lower aliphatic carboxylic acids having 1 to 4 carbon atoms, and mixtures of at least one of the above-mentioned compounds with water.

16. The process as claimed in claim 1, wherein said coagulation is carried out in two or more stages.

17. The process as claimed in claim 1, wherein the resultant hollow filaments are drawn at a temperature of from 20° to 600° C.

18. The process as claimed in claim 1, wherein the resultant hollow filaments are dranw at a draw ratio of from 1.1 to 5.0.

19. The process as claimed in claim 17, wherein said drawing procedure is carried out in a dry atmosphere.

20. The process as claimed in claim 17, wherein said drawing procedure is carried out in a wet medium.

* * * * *

UNITED STATES PATENT AND TRADEMARK OFFICE
CERTIFICATE OF CORRECTION

PATENT NO. : 4,460,526
DATED : July 17, 1984
INVENTOR(S) : Hiroshi MAKINO et al.

It is certified that error appears in the above—identified patent and that said Letters Patent is hereby corrected as shown below:

Claim 18, line 2, change "dranw" to --drawn--.

Signed and Sealed this

Nineteenth Day of March 1985

[SEAL]

Attest:

DONALD J. QUIGG

*Attesting Officer*   *Acting Commissioner of Patents and Trademarks*